Sept. 29, 1925.
I. BENKÖ
1,555,098
PROTECTIVE MEANS AGAINST BREAKING OF TOOLS
Filed July 17, 1923   2 Sheets-Sheet 1
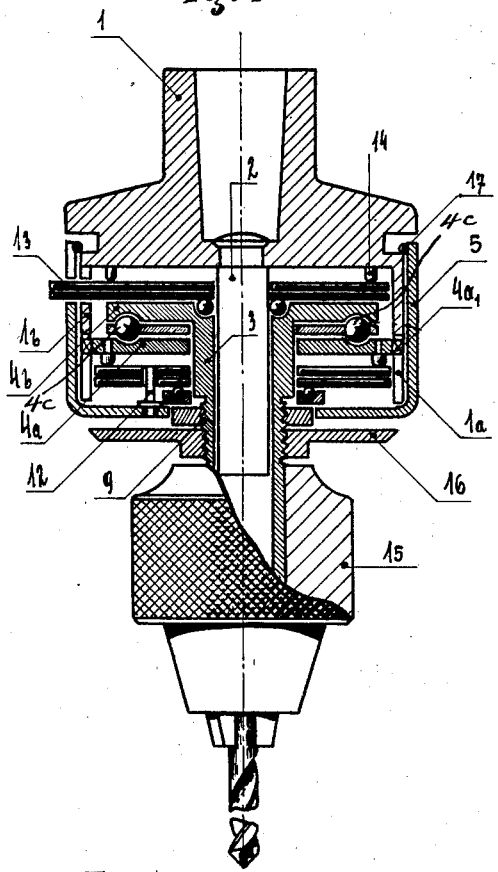
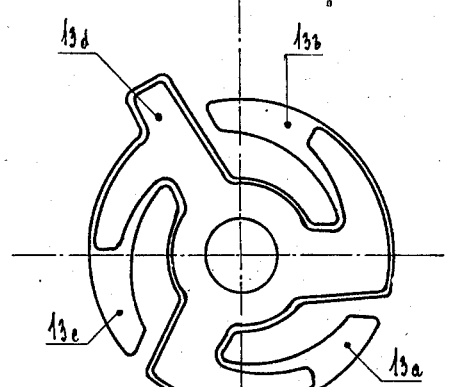
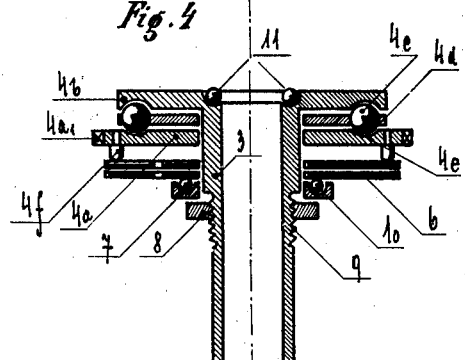
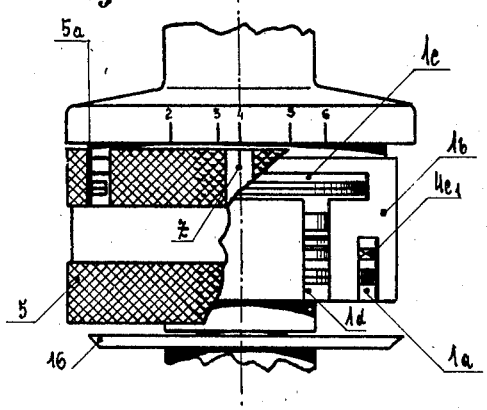
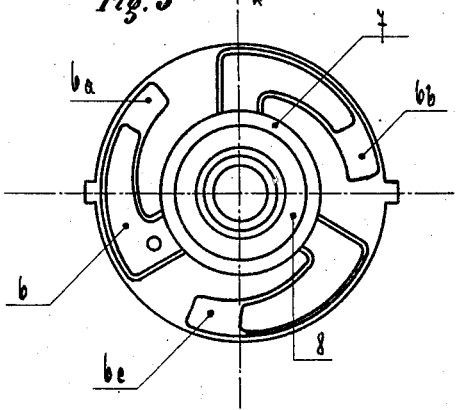
Inventor
I. Benkö
by Langner, Parry, Card & Langner
Attys Sept. 29, 1925.
I. BENKÖ
1,555,098
PROTECTIVE MEANS AGAINST BREAKING OF TOOLS
Filed July 17, 1923   2 Sheets-Sheet 2
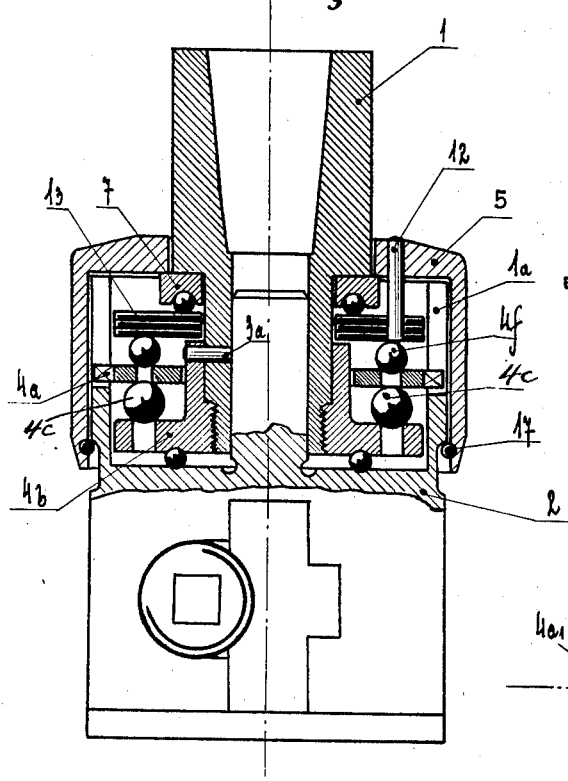
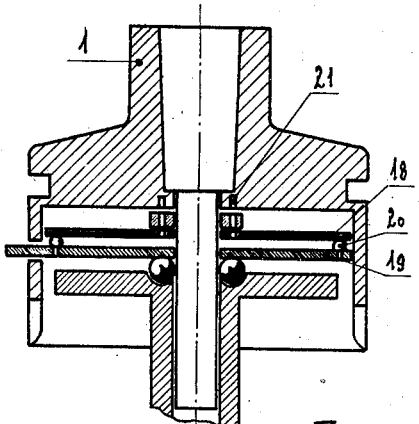
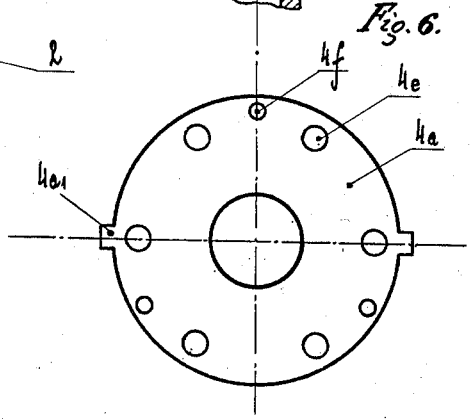
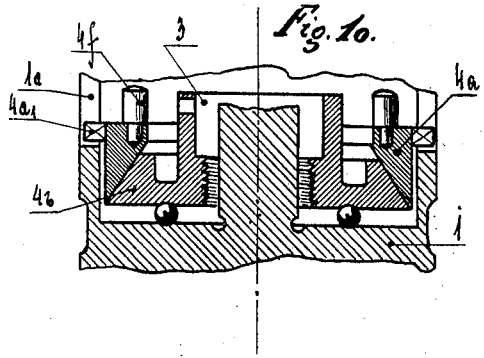
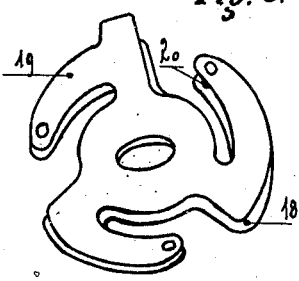
Inventor
I. Benkö
by Langner, Parry, Card & Langner
Attys.

Patented Sept. 29, 1925.

1,555,098

UNITED STATES PATENT OFFICE.

IVAN BENKÖ, OF VIENNA, AUSTRIA, ASSIGNOR TO THE FIRM FLEXO-INDUSTRIE-GESELLSCHAFT M. B. H., OF VIENNA, AUSTRIA.

PROTECTIVE MEANS AGAINST BREAKING OF TOOLS.

Application filed July 17, 1923. Serial No. 652,164.

*To all whom it may concern:*

Be it known that I, IVAN BENKÖ, a citizen of the Republic of Austria, residing at Vienna, Austria, have invented certain new and useful Improvements in Protective Means Against Breaking of Tools, of which the following is a specification.

Drilling and screw cutting devices for disconnecting the drill or tool from its driving member when the stress on it is too excessive or for releasing an overload clutch and thereby stopping the tool are known. Hitherto such means have been responsive only to torsional stresses on the tool and have given no protection against excessive axial pressure so that heretofore only partial protection has been given against breaking of the tool whereas the object of the present invention is to provide for effective protection against breaking in all directions.

With the above object in view the present invention may be regarded as consisting in providing a device which acts protectively against breakage of a drill or other tool by reason of either excessive torsion or excessive axial pressure.

More specifically stated the improved device comprises a yielding clutch which interrupts the drive of the tool when excessive stresses due to torsion or axial pressure occur. This clutch conveniently may take the form of a ball clutch but any other clutch may be used having resilient loading levers adjustable in length or action and may be adjustable in length or action and may be embodied in protecting devices which come into operation only when torsional or only axial forces come into action.

Clutches hitherto proposed have afforded a protection against breakage of the drill if the drill meets with natural resistances or if the drill is locked by cuttings during drilling or by casting faults in the material, but when the drill is exposed to excessive axial pressure the drill will be broken particularly in the case of drills of smaller sizes. Such a clutch may be arranged for example for a drill 4 mm. in diameter and having a feed of 0.1 mm. In order to obtain this feed with a sharp drill, the operator must exert a pressure of about 50 kgs. on the drill. If the drill still be sharp and a pressure of from 60 to 70 kg. is exerted thereon instead of 50 kg. then a greater feed as for example 0.15 takes place with a greater removal of cuttings and a resulting greater torsional stress on the drill. The clutch having been set for 0.1 mm. feed, it will be released by the higher torsional stress and immediately be brought to a standstill.

If however, the drill becomes blunt during operation and this greater axial pressure occurs, then a greater removal of cuttings cannot take place, but although a greater torsion will be avoided nevertheless a greater axial pressure will occur and if the clutch is not released thereby the drill may be broken.

In accordance with the present invention in order to bring the drill to a standstill, in spite of the excessive axial pressure, in good time before breakage occurs, even when the cutting edges have become blunt or when hard material is being operated upon, a device is provided by which when excessive axial pressure occurs the clutch is released and the drill brought to standstill. In this manner the drill is protected against breaking in every way, irrespective of the material which is being operated upon, as soon as the maximum permissible drill resistances dependent on the resistive capacity of the drill have been reached and not according to the rigidity of the material. An embodiment of the present invention in its preferred form comprises an overload clutch device which comes into operation as soon as a predetermined torsional stress is exceeded and also a device which brings the drill automatically to a standstill when the axial pressure becomes too great, both protecting devices being capable of adjustment and operating together. A device for indicating the feed pressure may form an effective means for the overload clutch.

In the accompanying drawings which show by way of example several structural embodiments of the invention:

Figure 1 is a longitudinal section wherein the various parts of the device are visible.

Figure 2 illustrates how the necessary axial pressure between the clutch parts can be adjusted by an adjusting cap, and Figure 3 shows the adjusting spring in plan.

Figure 4 is a longitudinal section similar to Fig. 1 of the anti-torsion overload clutch as a complete unit.

Figure 5 is a horizontal section corresponding with Fig. 4 below the springs looking upwards.

Figure 6 shows the lower clutch disc in Fig. 4 seen from above.

Figure 7 shows a second constructional form for adjusting the axial pressure.

Figure 8 shows the corresponding adjustable springs in perspective and seen from underneath, and Figure 9 illustrates how an overload clutch according to the invention is embodied into a chuck.

Figure 10 shows an embodiment of the invention with a friction disc clutch.

In the driving member 1 may be seated a shaft 2 for centering the driven member 3, the members 1 and 3 being coupled together by an overload clutch 4 (Fig. 4) of which the capacity for power transmission is adjustable by adjustable loading arms or springs. The clutch may be formed by a ball clutch or a ball locking clutch which also has the advantage that the de-clutched parts move relatively with rolling friction. The clutch is provided with two clutch discs $4^a$ and $4^b$, between which are arranged the balls $4^c$, preferably seated in a ball cage $4^d$ so that they always remain at the same distance apart, and on the surfaces of the clutch discs $4^a$ and $4^b$, turned towards each other, there are provided, adjacent the balls, corresponding recesses $4^e$ in which the balls engage when the clutch is engaged and out of which they roll when the clutch is disengaged. The clutch disc $4^a$ is directly engaged by the driving member and for this purpose engages by means of lugs $4^a_1$ (Fig. 4 and Fig. 6) in vertical slots $1^a$ (Fig. 2) of the hollow casing $1^b$ of the driving member which is adapted to receive the parts of the clutch. Over this casing $1^b$ may also be placed an enclosing cap 5 which may serve as adjusting member for the overload clutch or in the constructional form according to Fig. 1 as adjusting member for the various adjustable parts of protecting device. For adjusting the clutch resistance of the overload clutch against de-clutching, disc like loading springs 6 are provided. These springs may have curved spring arms, as shown in Fig. 5 and these spring arms $6^a$, $6^b$, $6^c$ bear against pins or projections $4^f$ which project from the underside of the clutch disc $4^a$ and are pressed against these projections $4^f$ by a predetermined pressure, by means of the central pressure ring 7, which is pressed against the springs by a nut 8, the nut being screwed on the internal screw thread 9 of the driven part 3. For reducing the friction between the ring 7 and the loading springs 6, a ball bearing 10 is interposed between said springs and ring. The driven part $4^b$ of the clutch may be formed as an annular flange on the driven part 3, and a ball bearing 11 is interposed between said part $4^b$ and the upper bearing surface which latter may be rigid or yielding and resilient yielding bearing surfaces being provided for limiting the axial feed pressure.

By adjusting the springs 6 in relation to the pins or projections $4^f$ the magnitude of the releasing resistance of the clutch may be varied and the clutch is rendered suitable for the transmission of the smallest torsional moment when the free ends of spring arms $6^a$, $6^b$, $6^c$ bear against the pins $4^f$, as in consequence of the longest lever arms the spring action is weakest the spring arms escaping more easily when the allowable torsional stress is exceeded. If the spring arms 6 are rotated around the longitudinal axis of the device so that the bearing points of the pins $4^f$ move towards the base of the spring arms the leverage of the spring arms becomes gradually shorter the spring action becomes stronger and the clutch is therefore capable of transmitting larger torsional forces. In the arrangement according to Fig. 1 the movement of the loading springs 4 is effected by the enclosing cap 5 the latter being connected to the springs by means of a pin 12. The adjustment may be effected according to a scale and for this purpose graduations are provided on the driving part 1 (Fig. 2) which directly indicate the adjustment which should be effected for a particular diameter of tool the mark Z on the enclosing cap being moved so as to coincide with the corresponding graduation on the part.

The clutch also serves to protect the tool against overload by a too high axial feed pressure as it also interrupts the drive in this case so that the tool is not liable to be broken by a too high axial pressure. On the other hand a visual or audible indicating device may be provided to indicate when the permissible axial pressure has been reached.

For protection against axial overload the clutch 4, preferably the annular flange $4^b$ thereof is supported against an adjustable bearing surface which is in the form of an elastic abutment interposed between the driving part 1 and clutch flange $4^b$. The elastic abutment may be composed of springs 13 which may be formed as disc springs or as spring arms with adjustable arm lengths and the effective length of arm is determined by pins 14 which contact with spring arms the pins or projections 14 being provided on the driving part 1. Adjustment may be effected as in the case of the springs 6 by rotating the springs 13 around the longitudinal axis of the device and for this purpose the spring 13 or one of the spring arms $13^a$, $13^b$, $13^c$ is provided with a handle $13^d$, which may be operated by hand or by the enclosing cap 5, the latter form of construction being shown in Figs. 1 and 2, the extension 13$^d$ of the springs engaging with a slot 5$^a$ in the enclosing cap and on turning the cap the springs are moved around the axis of the device. The extreme positions of adjustment are limited by a horizontal slot 1$^c$ provided in the hollow casing 1$^b$, the slot 1$^d$ of the casing (Fig. 2) being used solely for the purpose of introducing the spring 13 with its handle 13$^d$ into its operating position. In the case of the springs 13$^a$, 13$^b$, 13$^c$, the resiliency of the spring increases with the increase of the distance of the bearing point 14 from the base or root of the spring arm and the spring action thus become weaker as the distance from the base or root of the arm increases whilst when the spring arm or loading arm becomes shorter the spring action becomes stronger. The adjustment of the springs 13 against exceeding the permissible axial pressure is effected generally by the adjusting cap 5, the springs 6 and 13 being chosen independently of each other and being of such dimensions that the set position of the overload springs against torsion for a given diameter of tool coincides with the overload position for preventing the axial pressure for the same tool being exceeded.

As the lugs 4$^a_1$ of the clutch ring 4$^a$ are directly supported by the upper wall of the vertical slot 1$^a$ of the driven part that means that part 1$^b$ is sitting upon the lugs 4$^a_1$ then when exerting the axial feed pressure in the direction from top to bottom in Fig. 1 the same counter pressure is transmitted from the tool to the driven part and the ball bearing 11 or the abutment therefor by the drill chuck 15 mounted on the driven part 2. This yielding abutment is formed by the spring 13 and when the axial feed pressure and therefore also the counter pressure exceed the value which the springs 13 can absorb according to their position, these springs or the spring arms will yield and the abutment 11 for the ball bearing will recede so that the driven part moves upwards whilst the position of the clutch disc 4$^a$ remains unchanged or can only take part in a portion of the axial movement of the locking ring, after the lugs 4$^a_1$ engage with the end of the slot 1$^a$ so that the balls 4$^c$ of the clutch pass out of the recesses and the clutch or drive is disengaged.

The driven part may also be connected directly with the indicating device, which for example may consist of a disc 16 which is screwed on the threaded portion 9 of the driven part and which is disposed at a determined distance from the bottom of the enclosing cap 5, the reduction of this distance indicating the increase of the axial feed pressure. The cap 5 is rigidly connected to the part 1 by a wire ring 17 (Fig. 1). The distance between parts 16 and 5 should not be allowed to become equal to zero. The supporting spring 13 may be tensioned to such an extent that the lugs 4$^a_1$ of the clutch ring disc 4$^a$ are disposed at a distance from the upper wall of the vertical slot 1$^a$ during normal operation so that as the distance of the indicating disc 16 from the underside of the enclosing cap 5 becomes gradually smaller the clutch parts 4$^a$ and 4$^b$ are not instantaneously separated from each other and produce the disengagement of the clutch, but this only occurs after the lugs 4$^a_1$ reach the wall of the slot and after further subsequent movement of the indicating disc 16 or the driven part 3 has taken place.

If on the other hand the axial feed pressure is reduced the springs 13 return to their normal supporting position, the clutch balls 4$^c$ roll into the recesses, the clutch being thus automatically re-engaged so that the tool can take part in an operative movement.

The springs 6 and 13 may be disposed singly or in any desired number above one another. In the form of construction illustrated in Figs. 1-6 the springs are arranged in pairs and the lever arms thereof can be formed of increased size towards the base or root the cross section breadth, and thickness of the arms increasing towards the base. Whilst the double springs according to Figs. 1-6 can be moved simultaneously, the arrangement according to Figs. 7 and 8 may also be such that one spring 18 remains stationary whilst the other spring 19 is movable relatively thereto. Both springs can also be formed as disc springs having spring arms arranged in a circle and can be provided with supporting pins 20, which are secured to the arms of one spring for example 19, and slide on the arms of the other springs. If then the pins 20 engage with the longest lever arm of the arms 18 the spring action is weakest and the springs are in a position to transmit only the smallest axial pressure, whilst when the lever arm becomes shorter the resistance of the springs increases. The springs 18 are prevented from turning by a suitable pin connection 21 between the spring 18 and the driving part 1. A similar arrangement is possible in connection with the overload clutch spring 6.

The overload clutch described may of course also be used with protecting devices which are only adapted to afford protection against exceeding the permissible torsional stresses. It may be used alone or with the device affording protection against exceeding the permissible axial feed pressure in hand tools for example in stocks and the like also as a tool holder or in drill chucks as also in machine tools when it is arranged in any suitable positions in the drilling spindle or in the feed spindle where it may be used in conjunction with the controlling device of the machine driving mechanism and as a releasing means for the control device. For instance it is also possible to arrange the overload clutch against torsional overstrain or against axial overstrain or against overstrains in both directions into the support of a lathe or of any other tool machinery.

Figure 9 shows a vertical cross section through a chuck in the interior of which the clutch is securely arranged. The parts corersponding in their function to those of Fig. 1 respectively of Fig. 4 have the same reference numbers although their positioning and shape is partly differing thereof.

Figure 10 shows a broken off section through an embodiment of the overload clutch device provided with friction discs 4ᵇ in place of the ball clutch. Here also the parts with the same function as those in Fig. 4 bear the same reference numbers.

Having now described my invention, what I claim as new and ask to secure by Letters Patent is:

1. A slip drive for drill chucks, comprising, a driving element, a driven element and an overload clutch interposed between the said elements, such clutch comprising two discs at right angles to the axis of the tool and adapted to move axially relatively to each other, the adjacent faces of the said discs being provided with recesses having inclined side walls, balls located between such discs and adapted to engage into the said recesses, a resilient body interposed between the clutch member positively revolving with the driving element and a stop member supported by the driven element, a second resilient body interposed between the driving element and the clutch member positively revolving with the driven element, the latter resilient body being elastically deformed whenever the axial pressure on the tool exceeds a predetermined limit the clutch member associated therewith receding from the other clutch member.

2. A slip drive for drill chucks, comprising, a driving element, a driven element and an overload clutch interposed between the said elements, such clutch comprising two discs at right angles to the axis of the tool, and adapted to move axially relatively to each other, the adjacent faces of the said discs being provided with recesses having inclined side walls, balls located between such discs and adapted to engage into the said recesses, a resilient body interposed between the clutch member positively revolving with the driving element and a stop member supported by the driven element, such clutch member being adapted to move axially relatively to the said driving member, a stop provided on the latter for limiting the axial movement of this clutch member, a second resilient body interposed between the driving element and the clutch member positively revolving with and fast on the driven element, the latter resilient body being elastically deformed whenever the axial pressure on the tool exceeds a predetermined limit, the clutch member associated therewith receding from the other clutch member.

3. A slip drive for drill chucks, comprising, a driving element, a driven element and an overload clutch interposed between the said elements such clutch comprising two discs at right angles to the axis of the tool, and adapted to move axially relatively to each other, the adjacent faces of the said discs being provided with recesses having inclined side walls, balls located between such discs and adapted to engage into the said recesses, a resilient body interposed between the clutch member positively revolving with the driving element and a stop member supported by the driven element, such clutch member being adapted to move axially relatively to the said driving member, a stop provided on the latter for limiting the axial movement of this clutch member, a second resilient body interposed between the driving element and the clutch member positively revolving with and fast on the driven element, the latter resilient body being elastically deformed whenever the axial pressure on the tool excedes a predetermined limit, the clutch member associated thereto receding from the other clutch member, indicating means fast on the driven element, and means for ascertaining the position of the indicating means relatively to the above said stop corresponding to the permissible maximum axial strain on the tool.

4. A slip drive for drill chucks, comprising, a driving element, a driven element and an overload clutch interposed between the said elements, a resilient body acting on one of the said clutch members, such resilient body comprising a central portion, substantially radial equidistant arms projecting therefrom, segments extending from the free ends of such radial arms such resilient body being interposed between one of said elements and one of the clutch members, the central portion being supported on one of the last named parts and the segments resting on pins projecting from the other of the last named parts and means for turning the said resilient body round the axis of the said other of the last named parts.

5. A slip drive for drill chucks, comprising a driving element, a driven element and an overload clutch interposed between the said elements, a resilient body acting on one of the said clutch members, such resilient body comprising a central portion, substantially radial equidistant arms projecting therefrom, segments extending from the free ends of such radial arms, the flexibility of such segments decreasing from their ends towards the said radial arms, such resilient body being interposed between one of said elements and one of the clutch members, the central portion being supported on one of the last named parts and the segments resting on pins projecting from the other of the last named parts and means for turning the said resilient body round the axis of the said other of the last named parts.

6. A slip drive for drill chucks, comprising a driving element, a driven element and an overload clutch interposed between the said elements, a resilient body acting on one of the said clutch members, such resilient body comprising a plurality of superposed springs each consisting of a central portion, equidistant radial arms projecting from such central portions, segments extending from the free ends of such radial arms, such resilient body being interposed between one of said elements and one of the clutch members, the central portion being supported on one of the last named parts and the segments resting on pins projecting from the other of the last named parts and means for turning the said resilient body round the axis of the said other of the last named parts.

7. A slip drive for drill chucks, comprising a driving element, a driven element and an overload clutch interposed between the said elements, such clutch comprising two members adapted to move axially relatively to each other and clutching elements located between such members, resilient bodies, one for each of the clutch members acting axially upon its associated clutch member, each of such resilient bodies comprising a central portion, substantially radial equidistant arms projecting therefrom and segments extending from the free ends of such radial arms, each of such resilient bodies being interposed between one of said elements and one of the clutch members, the central portion being supported on one of the last named parts and the segments resting on pins projecting from the other of the last named parts and means for turning the said resilient body round the axis of the said other of the last named parts, one of these resilient bodies being elastically deformed whenever the axial pressure on the tool exceeds a predetermined limit, the clutch member associated therewith receding from the other clutch member.

8. A slip drive for drill chucks, comprising, a driving element, a driven element and an overload clutch interposed between the said elements, such clutch comprising two members adapted to move axially relatively to each other and clutching elements located between such members, resilient bodies, one for each of the clutch members acting axially upon its associated clutch member, each of such resilient bodies comprising a plurality of superposed springs each consisting of a central portion, equidistant radial arms projecting from such central portions and segments extending from the free ends of such radial arms, each of such resilient bodies being interposed between one of said elements and one of the clutch members, the central portion being supported on one of the last named parts and the segments resting on pins projecting from the other of the last named parts and means for turning the said resilient body round the axis of the said other of the last named parts, one of these resilient bodies being elastically deformed whenever the axial pressure on the tool exceeds a predetermined limit, the clutch member associated therewith receding from the other clutch member.

9. A slip drive for drill chucks, comprising, a driving element, a driven element and an overload clutch interposed between the said elements, such clutch comprising two members adapted to move axially relatively to each other and clutching elements located between such members, resilient bodies, one for each of the clutch members acting axially upon its associated clutch member, each of such resilient bodies comprising a central portion, substantially radial equidistant arms projecting therefrom and segments extending from the free ends of such radial arms each of such resilient bodies being interposed between one of said elements and one of the clutch members, the central portion being supported on one of the last named parts and the segments resting on pins projecting from the other of the last named parts and means for turning the said resilient body round the axis of the said other of the last named parts, one of these resilient bodies being elastically deformed whenever the axial pressure on the tool exceeds a predetermined limit, the clutch member associated therewith receding from the other clutch member, and a casing adapted to be rotated and locked in position on the driving element and enclosing the clutch members and the resilient bodies, the latter being provided with projections engaging the said casing.

10. A slip drive for drill chucks, comprising, a driving element, a driven element and an overload clutch interposed between the said elements, such clutch comprising two members adapted to move axially relatively to each other and clutching elements located between such members, resilient bodies, one for each of the clutch members acting axially upon its associated clutch member, each of such resilient bodies comprising a central portion, substantially radial equidistant arms projecting therefrom and segments extending from the free ends of such radial arms, each of such resilient bodies being interposed between one of said elements and one of the clutch members, the central portion being supported on one of the last named parts and the segments resting on pins projecting from the other of the last named parts and means for turning the said resilient body round the axis of the said other of the last named parts, one of these resilient bodies being elastically deformed whenever the axial pressure on the tool exceeds a predetermined limit, the clutch member associated therewith receding from the other clutch member and a casing adapted to be rotated and locked in position on the driving element and enclosing the clutch members and the resilient bodies, the latter being provided with projections engaging the said casing, and means for indicating the position of the casing relatively to the driving element.

In testimony whereof I affix my signature.

IVAN BENKÖ.